(No Model.)

J. B. HANSELL.
CAR WHEEL.

No. 320,246. Patented June 16, 1885.

WITNESSES:
L. Douville
W. F. Kircher

INVENTOR:
James Burne Hansell
BY Joshua Niederohein
ATTORNEY.

UNITED STATES PATENT OFFICE.

JAMES BURNE HANSELL, OF SHEFFIELD, COUNTY OF YORK, ENGLAND.

CAR-WHEEL.

SPECIFICATION forming part of Letters Patent No. 320,246, dated June 16, 1885.

Application filed April 4, 1885. (No model.) Patented in England November 8, 1883, No. 5,287.

*To all whom it may concern:*

Be it known that I, JAMES BURNE HANSELL, a subject of the Queen of Great Britain, residing at Sheffield, in Yorkshire, England, have invented a new and useful Improvement in Car-Wheels, which improvement is fully set forth in the following specification and accompanying drawings, in which—

Figure 1:
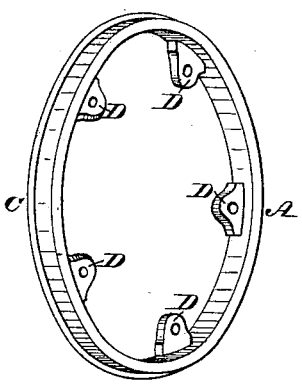
Figure 2:
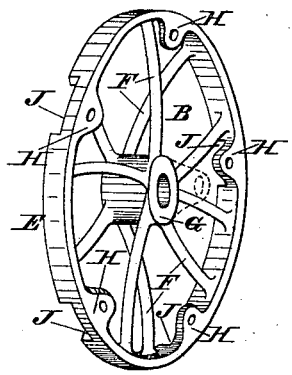
Figure 3:
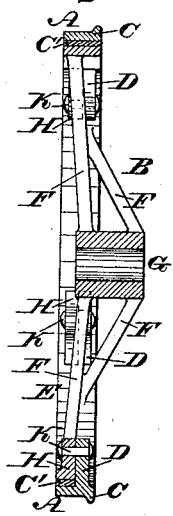

Figures 1 and 2 represent perspective views of the parts of a car-wheel embodying my invention. Fig. 3 represents a diametrical section of the complete wheel.

Similar letters of reference indicate corresponding parts in the several figures.

My invention consists of a wheel formed of interchangeable parts provided with means for readily connecting and separating the same.

It further consists of a wheel formed with two sets of alternately-disposed spokes, whereby the wheel possesses great strength.

It also consists in hardening or chilling the tire of the wheel.

It further consists of packing interposed between the rims of the two parts of the wheel.

Referring to the drawings, A represents the tire part of a car-wheel, and B the interior or body part thereof.

The tire part A consists of a flanged rim, C, with inwardly-projecting lugs or ears D, and the body part B consists of a rim, E, spokes F, hub G, and lugs or ears H, which are formed together, said lugs H projecting inwardly from said rim E.

The parts A B are made of any suitable metal; but I prefer to use cast-steel for the same.

In the side of the part B are recesses J, which are adapted to receive the lugs D of the part A, it being noticed that the lugs D H occupy coincident positions, whereby they come in contact and rest side by side.

When the body part is fitted within the tire portion, the lugs D enter the recesses J, and the lugs H are contiguous, the two sets of lugs D H, it being noticed, occupying coincident positions on the inner periphery of the wheel. A bolt or rivet, K, is passed through each pair of lugs D H, and when properly tightened clamp said lugs, whereby the two parts of the wheel are firmly connected, so as to run as one. Should either part wear out or break, the bolts or rivets K are loosened or removed and the parts separated, whereby either part may be renewed and replaced, the parts being interchangeable.

A boss for a crank or wrist pin may be cast with the body part B for purposes of locomotive-engines, and, if desired, the rim of the part A may be formed without a flange.

The tire of the part A is formed of metal harder than that of the body B, the same being chilled or otherwise produced, whereby the strength of the wheel is increased; and in general results there is economy in the use of a wheel embodying my invention, as there is no absolute loss of the entire wheel should either part be broken or worn out, and expensive retiring is avoided.

The spokes of the wheel are disposed in two sets, alternating with each other so as to break joints, and the sets are curved in reverse direction, thus making a strong and durable wheel, and one in which the body of the wheel is less liable to break down than heretofore, it being noticed that the two sets of spokes join the hub in different planes and join the rim in the same plane, the manner of joining the spokes and hub spreading the spokes at what may be their base, and consequently increasing the strength of the wheel.

Between the rims C E is a packing, C', of hard wood, soft or melted metal, or other material, which prevents a dead thrust of one rim on the other and acts as a cushion therefor.

I am aware that it is not new to form a metallic car-wheel of separate parts, and therefore do not claim the same broadly; but, Having fully described my invention, what I do claim as new, and desire to secure by Letters Patent, is—

1. A wheel having a tire part, A, provided with a rim, C, with a set of inwardly-projecting ears, D, at intervals integral therewith, and a body part provided with a rim, E, having a set of inwardly-projecting ears, H, at intervals integral therewith, spokes, and a hub, the sides of the rim E having recesses J, which coincide in position with the ears H and receive the ears D of the tire part, the two sets of the ears occupying coincident positions on the inner periphery of the wheel, and being firmly secured together, substantially as described.

2. A wheel formed of the tire part A, having a rim, C, with inwardly-projecting ears D, and a body part consisting of a rim, E, with inwardly-projecting ears H and recesses J, and a hub with two sets of spokes which alternate, and are curved in opposite directions, and join the hub in different planes, and join the tire in the same plane, the ears D H occupying coincident positions on the inner periphery of the wheel and being firmly secured together, substantially as described.

3. A wheel formed of a tire part having a rim and inwardly-projecting ears integral therewith and a body part consisting of a rim having inwardly-projecting ears integral therewith, with spokes and a hub, the sides of the rim of the body part being recessed to receive the ears of the tire part, the two sets of ears occupying coincident positions on the inner periphery of the wheel and secured together, substantially as described.

JAMES BURNE HANSELL.

Witnesses:
JOHN A. WIEDERSHEIM,
A. P. GRANT.